US012148543B2

(12) United States Patent
Johansen et al.

(10) Patent No.: US 12,148,543 B2
(45) Date of Patent: Nov. 19, 2024

(54) ION TRAP LOADING ASSEMBLY

(71) Applicant: Quantinuum LLC, Broomfield, CO (US)

(72) Inventors: Jacob Ivan Johansen, Westminster, CO (US); Thomas Howard Loftus, Lake Stevens, WA (US); Brian Vincent Estey, Louisville, CO (US)

(73) Assignee: Quantinuum LLC, Broomfield, CO (US)

( * ) Notice: Subject to any disclaimer, the term of this patent is extended or adjusted under 35 U.S.C. 154(b) by 422 days.

(21) Appl. No.: 17/651,840

(22) Filed: Feb. 21, 2022

(65) Prior Publication Data

US 2022/0319730 A1    Oct. 6, 2022

Related U.S. Application Data

(60) Provisional application No. 63/200,834, filed on Mar. 31, 2021.

(51) Int. Cl.
*G21K 1/00*  (2006.01)
*G06N 10/40*  (2022.01)
(Continued)

(52) U.S. Cl.
CPC ............ *G21K 1/006* (2013.01); *G06N 10/40* (2022.01); *G21K 1/06* (2013.01); *G21K 1/093* (2013.01)

(58) Field of Classification Search
CPC .......... G21K 1/006; G21K 1/06; G21K 1/093; G21K 1/003; G06N 10/00; G06N 10/40; H01J 49/04

(Continued)

(56) References Cited

U.S. PATENT DOCUMENTS 8,710,428 B1    4/2014  Loftus et al.
10,288,428 B1 *  5/2019  Cingoz ............... G21K 1/00
(Continued)

FOREIGN PATENT DOCUMENTS

GB          2595074 A  * 11/2021  ............ G01C 19/58

OTHER PUBLICATIONS

Wodey, et al. "A Robust, High-Flux, Source of Laser-Cooler Ytterbium Atoms", Journal of Physics B, Aug. 18, 2020, 12 pages. (Year: 2020).*

(Continued)

*Primary Examiner* — Jason L Mccormack
(74) *Attorney, Agent, or Firm* — Alston & Bird LLP (57) ABSTRACT

A loading assembly configured for providing atomic objects to an atomic object confinement apparatus is provided. The loading assembly comprises one or more ovens. Each oven (a) comprises a respective oven nozzle and (b) is configured to generate a respective atomic flux of a respective atomic species via the respective oven nozzle. The loading assembly comprises a mirror array and a magnet array configured to, when optical beams are provided to the mirror and magnet assembly, generate a two-dimensional magneto-optical trap (2D MOT). The 2D MOT is configured to generate a substantially collimated atomic beam from the respective atomic fluxes generated by the one or more ovens. The loading assembly further comprises a differential pumping tube defining a beam path. The differential pumping tube is configured to provide the substantially collimated atomic beam via the beam path. The respective oven nozzle of each of the one or more ovens is misaligned with the beam path and the 2D MOT is configured to provide the substantially collimated atomic beam in alignment with the beam path.

20 Claims, 5 Drawing Sheets

(51) Int. Cl.
*G21K 1/06* (2006.01)
*G21K 1/093* (2006.01)

(58) Field of Classification Search
USPC .......................................................... 250/251
See application file for complete search history.

(56) References Cited

U.S. PATENT DOCUMENTS

| | | | |
|---|---|---|---|
| 10,755,913 | B2 | 8/2020 | Kim et al. |
| 10,776,544 | B2 | 9/2020 | Delaney et al. |
| 11,037,776 | B1 | 6/2021 | Makotyn et al. |
| 2019/0348251 | A1 | 11/2019 | Monroe et al. |
| 2020/0025639 | A1* | 1/2020 | Madison ................ G01L 27/002 |
| 2020/0184024 | A1 | 6/2020 | Nam et al. |
| 2020/0394545 | A1 | 12/2020 | Kliuchnikov et al. |
| 2022/0199391 | A1 | 6/2022 | Hayes et al. |

OTHER PUBLICATIONS

Bruzewicz, C. D., et al., "Scalable Loading of a Two-Dimensional Trapped-Ion Array", dated Nov. 9, 2018, retreived from the Internet at <URL: https://arxiv.org/pdf/1511.03293.pdf> on Jan. 8, 2021, 5 pages.

Bruzewicz, Colin D., et al., "Scalable loading of a two-dimentional trapped-ion array", Nature Communications, Sep. 28, 2016, retreived from the Internet at <URL: https://www.nature.com/articles/ncomms13005>, 6 pages.

Partial European search report Mailed on Aug. 23, 2022 for EP Application No. 22165709, 11 pages.

Sage, Jeremy, M., et al., "Loading of a surface-electrode ion trap from a remote, precooled source", Phys. Rev. A, dated Jul. 23, 2012, retreived from the Internet at <URL: https://arxiv.org/pdf/1205.6379.pdf> on Feb. 10, 2021, 10 pages.

Wodey, E., et al., "A robust, high-flux source of laser-cooled ytterbium atoms", Journal of Physics B, Aug. 18, 2020, retreived from the Internet at <URL: https://arxiv.org/pdf/2008.07498.pdf> on Aug. 17, 2022, 12 pages.

Bowden, William, et al., "An adaptable dual species effusive source and Zeeman slower design demonstrated with Rb and Li", Review of Scientific Instruments, Apr. 18, 2016, pp. 1-11, vol. 87, No. 043111, American Institute of Physics, US.

Extended European search report Mailed on Dec. 7, 2022 for EP Application No. 22165709.

* cited by examiner

ION TRAP LOADING ASSEMBLY

CROSS-REFERENCE TO RELATED APPLICATIONS

This application claims priority to U.S. Application No. 63/200,834, filed Mar. 31, 2021, the content of which is incorporated herein by reference in its entirety.

TECHNICAL FIELD

Various embodiments relate to apparatuses, systems, and methods relating to loading an atomic object confinement apparatus, such as an ion trap, for example, with atomic objects, such as ions, for example. Various embodiments relate to loading multiple species of atomic objects into an atomic object confinement apparatus using a two-dimensional (2D) magneto-optical trap.

BACKGROUND

Conventional atomic sources for loading ion traps provide a cloud of atoms, some of which are ionized and captured by the ion trap. However, a significant number of the atoms are not trapped and become background gas within the vacuum chamber that the ion trap is disposed within. Thus, conventional atomic sources load relatively slowly and compromise the performance of the vacuum within the vacuum chamber. Through applied effort, ingenuity, and innovation many deficiencies of prior ion trap loading techniques have been solved by developing solutions that are structured in accordance with the embodiments of the present invention, many examples of which are described in detail herein.

BRIEF SUMMARY OF EXAMPLE EMBODIMENTS

Example embodiments provide methods, systems, apparatuses, computer program products and/or the like for loading atomic objects into an atomic object confinement apparatus. In various embodiments, two or more species of atomic objects are loaded into the atomic object confinement apparatus. In various embodiments, a loading assembly comprises an oven configured to provide a flux of atomic objects. In various embodiments, the loading assembly comprises multiple ovens, with each oven configured to provide a flux of atomic objects of a respective species. In various embodiments, each of the ovens is misaligned from the atomic object confinement apparatus and/or a loading position of the atomic object confinement apparatus. In various embodiments, the loading assembly is configured to generate a collimated multiple species atomic beam that is directed toward and/or aligned with the atomic object confinement apparatus and/or the loading position of the atomic object confinement apparatus.

In various embodiments, the loading assembly comprises a 2D magneto-optical trap (MOT). In various embodiments, atomic fluxes generated by the one or more ovens of the loading assembly exit the respective ovens and flow into the 2D MOT. As noted above, the ovens are offset from the atomic object confinement apparatus and/or the loading position of the atomic object confinement apparatus. The 2D MOT collimates the incoming atomic fluxes and redirects the atomic fluxes such that a collimated, multiple species atomic beam is provided by the loading apparatus to the atomic object confinement apparatus and/or a loading position of the atomic object confinement apparatus.

In various embodiments, the loading assembly comprises a differential pumping tube. In such embodiments, the ovens may remain on while the atomic object confinement apparatus is being used to perform one or more functions (e.g., executing a quantum algorithm and/or circuit as a quantum processor, and/or the like). For example, the loading assembly may be configured to contain a multiple species atomic cloud (e.g., within the MOT and/or within a chamber of the loading assembly) such that the multiple species atomic beam may be provided to the atomic object confinement apparatus on demand without introducing a significant amount of background gas in the vicinity of the atomic object confinement apparatus. For example, atomic objects confined by the atomic object confinement apparatus experience the same or lower rates of background collisions (e.g., collisions with background gas) as ions trapped by an ion trap loaded using conventional loading means.

In various embodiments, the loading assembly is located and/or disposed a distance away from the atomic object confinement apparatus. For example, the loading assembly is located and/or disposed more than 0.25 meters (e.g., approximately 0.4 meters) from the atomic object confinement apparatus, in an example embodiment. Thus, the loading assembly does not introduce a significant amount of thermal energy in the vicinity of the atomic object confinement apparatus. In various embodiments, one or more thermal and/or radiation shields are disposed between the loading assembly and the atomic object confinement apparatus.

In various embodiments, an ionization beam (e.g., a laser beam) ionizes atomic objects in the multiple species atomic beam as the beam approaches the atomic object confinement apparatus and/or the loading position of the atomic object confinement apparatus. The ionized atomic objects, which comprise multiple species of ions, are then captured by the trapping potential of the atomic object confinement apparatus.

In various embodiments, the atomic object confinement apparatus is an ion trap, such as a surface Paul trap, for example. In various embodiments, atomic object confinement apparatus is configured to be a quantum processor of a quantum computer for performing and/or executing quantum circuits and/or algorithms. In an example embodiment, the multiple species of the atomic objects comprise an atomic species used as a qubit of the quantum computer. In an example embodiment, the multiple species of the atomic objects comprise an atomic species used a sympathetic cooling ion of the quantum computer.

According to an aspect of the present disclosure, a loading assembly for providing atomic objects to an atomic object confinement apparatus is provided. In an example embodiment, the loading assembly comprises one or more ovens. Each oven of the one or more ovens (a) comprises a respective oven nozzle and (b) is configured to generate a respective atomic flux of a respective atomic species via the respective oven nozzle. The loading assembly further comprises a mirror array and a magnet array configured to, when optical beams are provided to the mirror array, generate a two-dimensional magneto-optical trap (2D MOT). The 2D MOT is configured to generate a substantially collimated atomic beam from the respective atomic fluxes generated by the one or more ovens. The loading assembly further comprises a differential pumping tube defining a beam path. The differential pumping tube is configured to provide the substantially collimated atomic beam via the beam path. The respective oven nozzle of each of the one or more ovens is misaligned with the beam path and the 2D MOT is configured to provide the substantially collimated atomic beam in alignment with the beam path.

In an example embodiment, the one or more ovens comprises a first oven and a second oven, the first oven configured to generate a first atomic flux of a first atomic species, the second oven configured to generate a second atomic flux of a second atomic species, and the substantially collimated atomic beam comprises atomic objects of both the first atomic species and the second atomic species.

In an example embodiment, the 2D MOT comprises a first laser beam of a first wavelength and a second laser beam of a second wavelength and at least one mirror of the mirror array is configured to reflect both the first and second wavelength.

In an example embodiment, the difference between the first wavelength and the second wavelength is greater than 100 nm or greater than 50 nm.

In an example embodiment, the loading assembly further comprises a differential pumping tube, wherein the loading assembly is configured such that the substantially collimated atomic beam passes through the differential pumping tube after exiting the 2D MOT and before entering the beam path of the differential pumping tube.

According to another aspect, a quantum computer is provided. In an example embodiment, the quantum computer comprises an atomic object confinement apparatus; and a loading assembly configured for providing atomic objects to the atomic object confinement apparatus. The loading assembly comprises one or more ovens. Each oven of the one or more ovens (a) comprises a respective oven nozzle and (b) is configured to generate a respective atomic flux of a respective atomic species via the respective oven nozzle. The loading assembly further comprises a mirror array and a magnet array configured to, when optical beams are provided to the mirror array, generate a 2D MOT. The 2D MOT is configured to generate a substantially collimated atomic beam from the respective atomic fluxes generated by the one or more ovens. The loading assembly further comprises a differential pumping tube defining a beam path. The differential pumping tube is configured to provide the substantially collimated atomic beam via the beam path. The respective oven nozzle of each of the one or more ovens is misaligned with the beam path and the 2D MOT is configured to provide the substantially collimated atomic beam in alignment with the beam path.

In an example embodiment, the respective oven nozzle of each of the one or more ovens does not have a direct line of sight of the atomic object confinement apparatus.

In an example embodiment, a distance between the loading assembly and the atomic object confinement apparatus is greater than 0.25 meters.

In an example embodiment, the atomic object confinement apparatus and the loading assembly are disposed, at least in part, within a cryostat and/or vacuum chamber.

In an example embodiment, the quantum computer further comprises one or more thermal shields disposed between the atomic object confinement apparatus and the loading assembly.

In an example embodiment, the one or more thermal shields each comprise an opening aligned with the differential pumping tube.

In an example embodiment, the one or more ovens comprises a first oven and a second oven, the first oven configured to generate a first atomic flux of a first atomic species, the second oven configured to generate a second atomic flux of a second atomic species, and the substantially collimated atomic beam comprises atomic objects of both the first atomic species and the second atomic species.

In an example embodiment, the 2D MOT comprises a first laser beam of a first wavelength and a second laser beam of a second wavelength and at least one mirror of the mirror array is configured to reflect both the first and second wavelength.

In an example embodiment, each of the mirrors of the mirror array is configured to reflect both the first and second wavelengths while preserving the power and polarization of an optical beam of the first wavelength and an optical beam of the second wavelength.

In an example embodiment, the first wavelength is configured to cool atomic objects of the first atomic species and the second wavelength is configured to cool atomic objects of the second atomic species.

In an example embodiment, the difference between the first wavelength and the second wavelength is greater than 100 nm or greater than 50 nm.

In an example embodiment, atomic objects of the first atomic species confined within the atomic object confinement apparatus are used as qubits of the quantum computer and atomic objects of the second atomic species confined within the atomic object confinement apparatus are used to sympathetically cool the qubits of the quantum computer.

In an example embodiment, the loading assembly further comprises a differential pumping tube, wherein the loading assembly is configured such that the substantially collimated atomic beam passes through the differential pumping tube after exiting the 2D MOT and before entering the beam path of the differential pumping tube.

In an example embodiment, the quantum computer further comprises one or more lasers configured to generate and provide the optical beams.

In an example embodiment, the quantum computer further comprises a controller, wherein the controller is configured to control operation of the one or more lasers.

In an example embodiment, the quantum computer further comprises a controller, wherein the controller is configured to control the one or more ovens and a trapping potential generated by electrodes of the atomic object confinement apparatus.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF SOME EXAMPLE EMBODIMENTS

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. The terms "generally," "substantially," and "approximately" refer to within engineering and/or manufacturing tolerances and/or within user measurement capabilities, unless otherwise indicated. Like numbers refer to like elements throughout.

Example embodiments provide methods, systems, apparatuses, computer program products and/or the like for loading atomic objects into an atomic object confinement apparatus. In various embodiments, two or more species of atomic objects are loaded into the atomic object confinement apparatus. In various embodiments, a loading assembly comprises an oven configured to provide a flux of atomic objects. In various embodiments, the loading assembly comprises multiple ovens, with each oven configured to provide a flux of atomic objects of a respective species. In various embodiments, each of the ovens is misaligned from the atomic object confinement apparatus and/or a loading position of the atomic object confinement apparatus. In various embodiments, the loading assembly is configured to generate a substantially collimated single species atomic beam.

In various embodiments, the loading assembly is configured to generate first substantially collimated single species atomic beam (e.g., a qubit atomic object species beam) and a second single species atomic beam (e.g., a sympathetic cooling atomic object species beam) at different and/or alternating times. In various embodiments, the loading assembly is configured to generate a substantially collimated multiple species atomic beam that is directed toward and/or aligned with the atomic object confinement apparatus and/or the loading position of the atomic object confinement apparatus.

Figure 2:
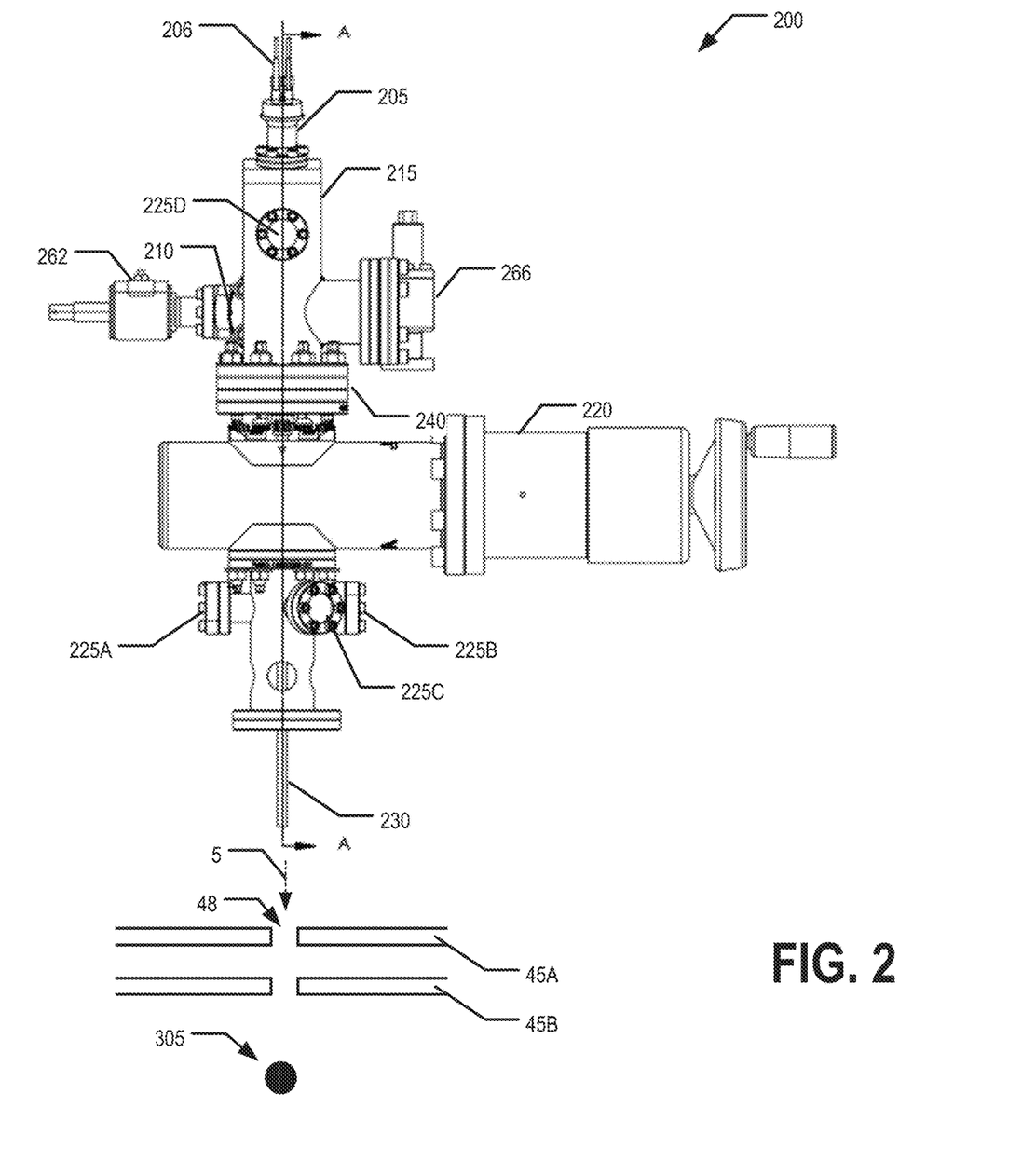
FIG. 2 is a side view of an example loading assembly configured to provide a multiple species atomic beam to a loading position of an atomic object confinement apparatus, according to an example embodiment.
Figure 3:
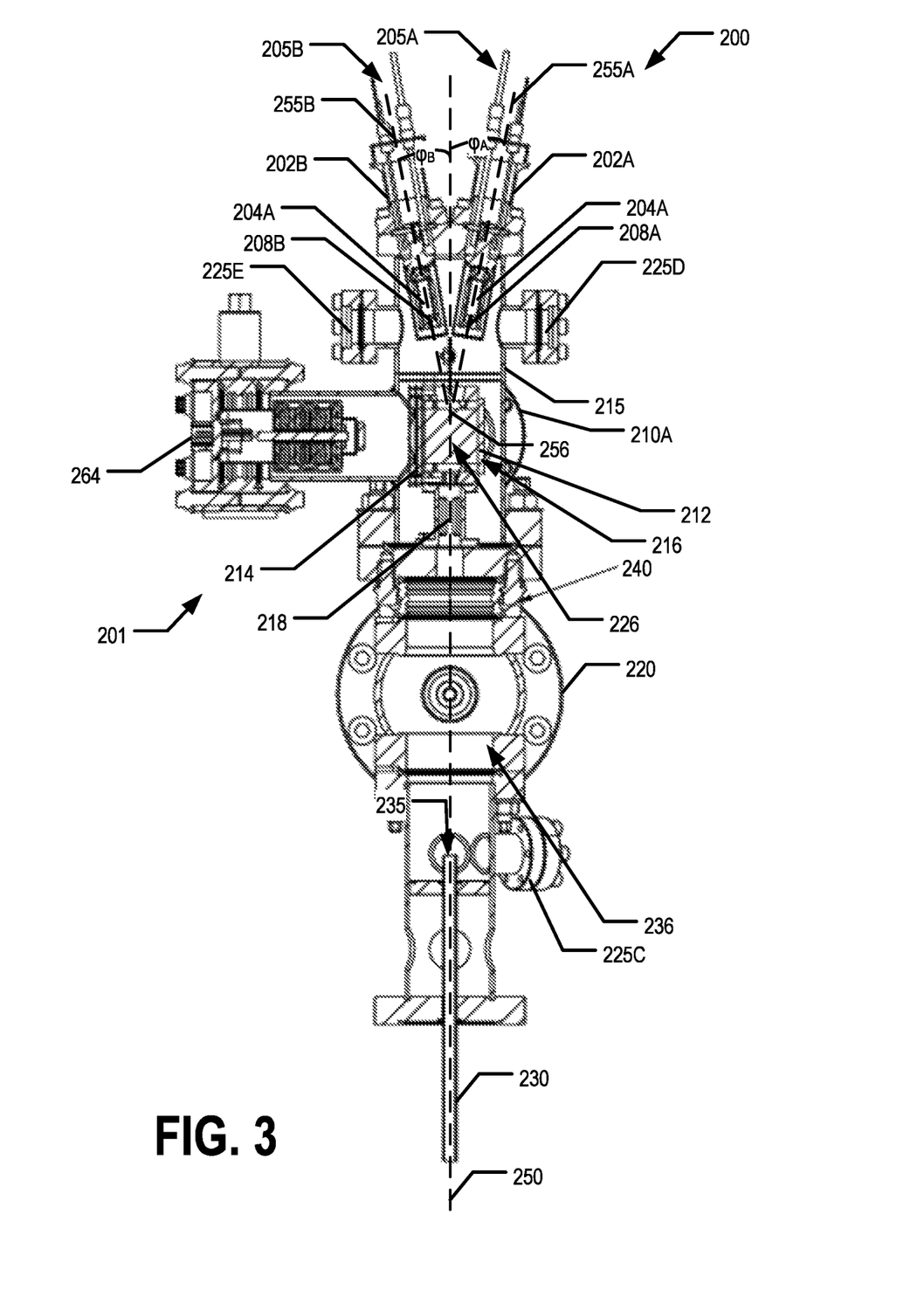
FIG. 3 is a cross-sectional view of the example loading assembly shown in FIG. 2 along the A-A line, according to an example embodiment.

For example, the loading assembly comprises two or more ovens, in various embodiments, with each oven configured to provide an atomic flux of a particular atomic object species (e.g., a qubit atomic object species and/or a sympathetic cooling atomic object species) and the atomic objects species present in the substantially collimated atomic beam is controlled via the operation of the manipulation sources 60. For example, when the sympathetic cooling species cooling beam is provided to the loading assembly 200 (e.g., to the mirror array 214 via the optical coupler 210) atomic objects of the sympathetic cooling atomic object species within the MOT chamber 216 experience a 2D MOT having MOT axis 256 and a substantially collimated atomic object beam comprises atomic objects of the sympathetic cooling atomic object species. However, when the sympathetic cooling species cooling beam is not provided to the loading assembly 200, the atomic objects of the sympathetic cooling atomic object species within the MOT chamber 216 do not experience a 2D MOT and the substantially collimated atomic object beam generally does not comprise atomic objects of the sympathetic cooling atomic object species. For example, when the qubit species cooling beam is provided to the loading assembly 200 (e.g., to the mirror array 214 via the optical coupler 210) atomic objects of the qubit atomic object species within the MOT chamber 216 experience a 2D MOT having MOT axis 256 and a substantially collimated atomic object beam comprises atomic objects of the qubit atomic object species. However, when the qubit species cooling beam is not provided to the loading assembly 200, the atomic objects of the qubit atomic object species within the MOT chamber 216 do not experience a 2D MOT and the substantially collimated atomic object beam generally does not comprise atomic objects of the qubit atomic object species. Thus, each of the ovens 205 may be generally operated and/or remain on such that substantially collimated atomic object beams comprising atomic objects of the qubit atomic object species and/or sympathetic cooling atomic object species can be quickly provided (e.g., in less than 10 milliseconds).

In various embodiments, the loading assembly comprises a 2D magneto-optical trap (MOT). In various embodiments, atomic fluxes generated by the one or more ovens of the loading assembly exit the respective ovens and flow into the 2D MOT. As noted above, the ovens are offset from the atomic object confinement apparatus and/or the loading position of the atomic object confinement apparatus. The 2D MOT collimates the incoming atomic fluxes and redirects the atomic fluxes such that a collimated, multiple species atomic beam is provided by the loading apparatus to the atomic object confinement apparatus and/or a loading position of the atomic object confinement apparatus.

In various embodiments, the loading assembly comprises a differential pumping tube. In such embodiments, the ovens may remain on while the atomic object confinement apparatus is being used to perform one or more functions (e.g., executing a quantum algorithm and/or circuit as a quantum processor, and/or the like). For example, the loading assembly may be configured to contain a multiple species atomic cloud (e.g., within the MOT and/or within a chamber of the loading assembly) such that the multiple species atomic beam may be provided to the atomic object confinement apparatus on demand without introducing a significant amount of background gas in the vicinity of the atomic object confinement apparatus. For example, atomic objects confined by the atomic object confinement apparatus experience the same or lower rates of background collisions (e.g., collisions with background gas) as ions trapped by an ion trap loaded using conventional loading means.

In various embodiments, the loading assembly is located and/or disposed a distance away from the atomic object confinement apparatus. For example, the loading assembly is located and/or disposed more than 0.25 meters (e.g., approximately 0.4 meters) from the atomic object confinement apparatus, in an example embodiment. Thus, the loading assembly does not introduce a significant amount of thermal energy in the vicinity of the atomic object confinement apparatus. In various embodiments, one or more thermal and/or radiation shields are disposed between the loading assembly and the atomic object confinement apparatus.

In various embodiments, an ionization beam (e.g., a laser beam) ionizes atomic objects in the multiple species atomic beam as the beam approaches the atomic object confinement apparatus and/or the loading position of the atomic object confinement apparatus. The ionized atomic objects, which comprise multiple species of ions, are then captured by the trapping potential of the atomic object confinement apparatus.

In various embodiments, the atomic object confinement apparatus is an ion trap, such as a surface Paul trap, for example. In various embodiments, atomic object confinement apparatus is configured to be a quantum processor of a quantum computer for performing and/or executing quantum circuits and/or algorithms. In an example embodiment, the multiple species of the atomic objects comprise an atomic species used as a qubit of the quantum computer. In an example embodiment, the multiple species of the atomic objects comprise an atomic species used a sympathetic cooling ion of the quantum computer.

Exemplary Quantum Computing System Comprising a Loading Assembly

Figure 1:
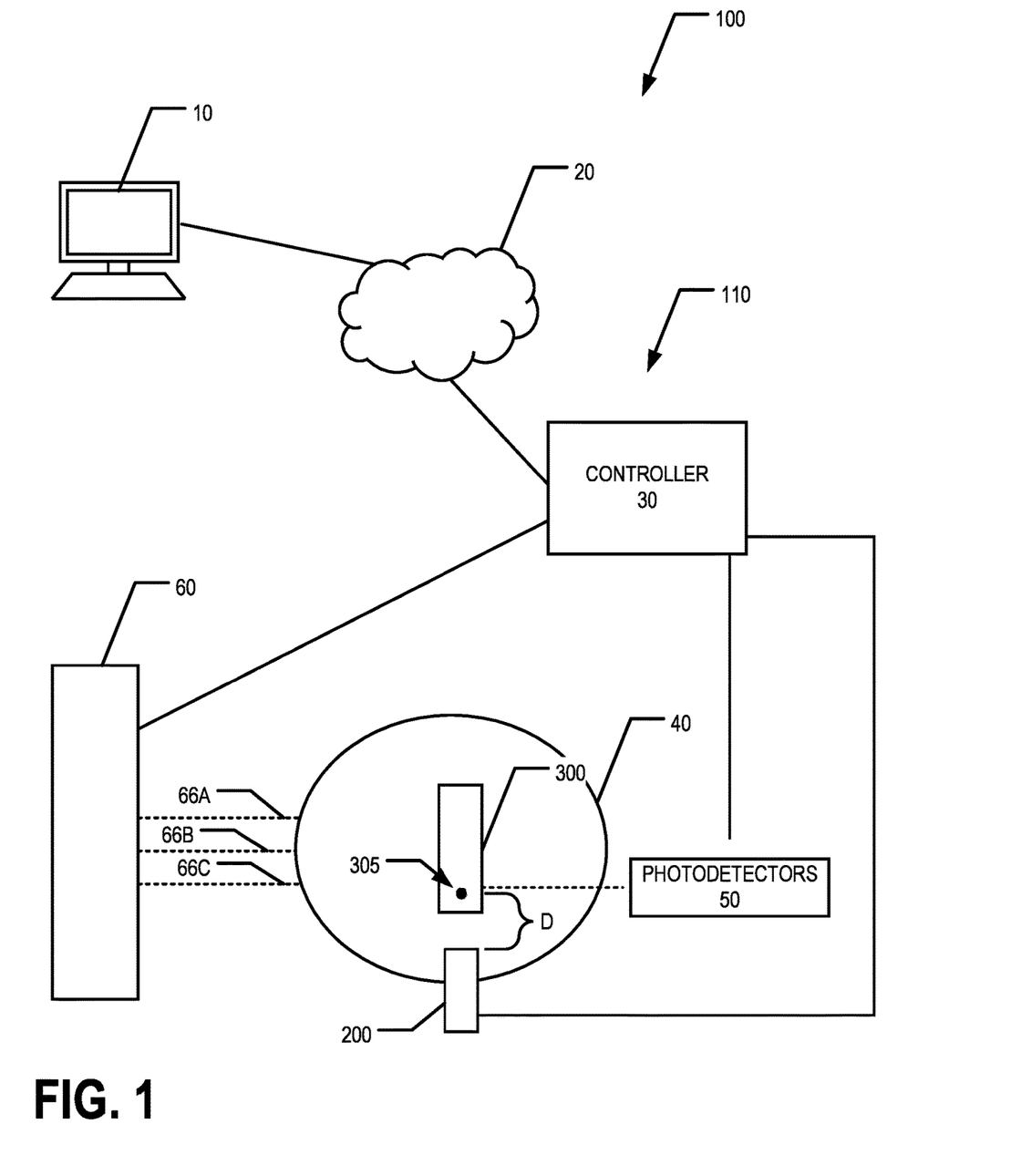
FIG. 1 is a schematic diagram illustrating an example quantum computing system comprising an atomic object confinement apparatus comprising meta material structures on a surface thereof, according to an example embodiment.

FIG. 1 provides a schematic diagram of an example quantum computing system 100 comprising an atomic object confinement apparatus 300 (e.g., an ion trap and/or the like) and a loading assembly 200, in accordance with an example embodiment. As shown in FIG. 2, the loading assembly 200 is configured to provide a substantially collimated atomic beam 5 to the atomic object confinement apparatus 300. For example, the loading assembly 200 is configured to provide a substantially collimated atomic beam 5 toward a loading position of the atomic object confinement apparatus 300, in various embodiments. In various embodiments, the quantum computing system 100 comprises an ionizing laser and corresponding optical elements configured to provide an ionizing laser beam that ionizes atomic objects of the substantially collimated atomic beam 5. The ionized atomic objects are then trapped and/or confined by a trapping potential generated by electrodes of the atomic object confinement apparatus 300. An example linear atomic object confinement apparatus is described by U.S. application Ser. No. 16/717,602, filed Dec. 17, 2019, though various other linear atomic object confinement apparatuses may be used in various embodiments. An example two-dimensional atomic object confinement apparatus is described by U.S. Application No. 63/199,279, filed Dec. 17, 2020, though various other two-dimensional atomic object confinement apparatuses may be used in various embodiments.

In various embodiments, the loading assembly 200 and the atomic object confinement apparatus 300 (and/or a loading position 305 of the atomic object confinement apparatus) are separated from one another by a distance D. In various embodiments, the distance D is at least 0.25 meters (e.g., in a range of 0.25 to 1.0 meters). In an example embodiment, the distance D is substantially equal to 0.4 meters.

In various embodiments, one or more radiation and/or thermal shields 45 (e.g., 45A, 45B) are disposed between the loading assembly 200 and the atomic object confinement apparatus 300. In various embodiments, each of the one or more radiation and/or thermal shields 45 comprises an opening 48 therethrough. The opening(s) 48 are aligned with the differential pumping tube 230 and/or the loading position 305 of the atomic object confinement apparatus 300 such that the substantially collimated atomic beam 5 can travel from the differential pumping tube 230 through the openings 48 of the radiation and/or thermal shields 45 to the loading position 305 of the atomic object confinement apparatus 300.

In various embodiments, the quantum computing system 100 comprises a computing entity 10 and a quantum computer 110. In various embodiments, the quantum computer 110 comprises a controller 30, a cryostat and/or vacuum chamber 40 enclosing the atomic object confinement apparatus 300 (e.g., an ion trap) and at least a portion of the loading assembly 200, and one or more manipulation sources 60. For example, the cryostat and/or vacuum chamber 40 may be a pumping and/or temperature-controlled chamber. In an example embodiment, the manipulation signals generated by the manipulation sources 60 are provided to the interior of the cryostat and/or vacuum chamber 40 (where the atomic object confinement apparatus 30 is located) via corresponding optical paths 66 (e.g., 66A, 66B, 66C). In an example embodiment, the one or more manipulation sources 60 may comprise one or more lasers (e.g., optical lasers, microwave sources, and/or the like). In various embodiments, each manipulation source is configured to generate a manipulation signal 60 having a respective characteristic wavelength in the microwave, infrared, visible, or ultraviolet portion of the electromagnetic spectrum.

In various embodiments, the one or more manipulation sources 60 are configured to manipulate and/or cause a controlled quantum state evolution of one or more atomic objects within the atomic object confinement apparatus 300, ionize atomic objects of the substantially collimated atomic beam 5, generate and provide a laser beam for generating a 2D MOT, cooling one or more species of atomic objects, and/or the like. For example, in various embodiments, the one or more manipulation sources 60 comprise one or more lasers and, in some embodiments, corresponding optical elements defining an optical path for delivering one or more manipulation signals to an appropriate position within the cryostat and/or vacuum chamber 40. For example, the manipulation sources 60 may be configured to generate one or more beams that may be used to initialize an atomic object into a state of a qubit space such that the atomic object may be used as a qubit of the confined atomic object quantum computer, perform one or more gates on one or more qubits of the confined atomic object quantum computer, read and/or determine a state of one or more qubits of the confined atomic object quantum computer, ionize an atomic object, and/or the like. In an example embodiment, the manipulation sources 60 comprise one or more lasers configured to generate optical beams used to form the 2D MOT.

In various embodiments, the 2D MOT comprises optical beams generated by manipulation sources 60. In various embodiments, the optical beams comprise three beam types: sympathetic cooling species cooling beams, sympathetic cooling species repump beams, and qubit species cooling beams. The three types of beams are coupled together into vacuum to produce the MOT.

In various embodiments, the sympathetic cooling species cooling beams have a characteristic wavelength corresponding to laser cooling of atomic species of the sympathetic cooling species (e.g., the species of atomic objects that will act as sympathetic cooling ions within the atomic object confinement apparatus and/or quantum processor). In an example embodiment, the sympathetic cooling species is Barium (Ba) and the characteristic wavelength of the sympathetic cooling species cooling beams is 553.7 nm. In an example embodiment, the sympathetic cooling species cooling beams are generated by a corresponding manipulation source 60 (e.g., a laser) and is transferred from the manipulation source via optical fiber to a plate where the beam is split into cooling and probe light with independent fine frequency control, then both beams are transferred via fiber to the MOT.

In various embodiments, the sympathetic cooling species repump beams have a characteristic wavelength corresponding to a repumped transition configured to maintain atomic objects of the sympathetic cooling species within the optical cooling cycle. In an example embodiment, a plurality of sympathetic cooling species repump beams (e.g., having different characteristic wavelengths) are used. In an example embodiment, the sympathetic cooling species is Barium (Ba) and the characteristic wavelengths of the sympathetic cooling species repump beams are 1500.4 nm and 1130.6 nm. In an example embodiment, the sympathetic cooling species repump beams are generated by corresponding manipulation sources 60 (e.g., lasers) and are transferred from the manipulation sources via optical fibers to a combining plate where the sympathetic cooling species repump beams are combined into a single fiber for transfer to the MOT.

In various embodiments, the qubit species cooling beams have a characteristic wavelength corresponding to laser cooling of atomic species of the qubit species (e.g., the species of atomic objects that will act as qubits within the atomic object confinement apparatus and/or quantum processor). In an example embodiment, the qubit species is Ytterbium (Yb) and the characteristic wavelength of the qubit species cooling beams is 398.9 nm. In an example embodiment, the qubit species cooling beams are generated by a corresponding manipulation source 60 (e.g., a laser) and is transferred directly from the manipulation source to the MOT (e.g., via optical fiber).

In various embodiments, the quantum computer 110 comprises an optics collection system configured to collect and/or detect photons generated by qubits (e.g., during reading procedures). The optics collection system may comprise one or more optical elements (e.g., lenses, mirrors, waveguides, fiber optics cables, and/or the like) and one or more photodetectors. In various embodiments, the photodetectors may be photodiodes, photomultipliers, charge-coupled device (CCD) sensors, complementary metal oxide semiconductor (CMOS) sensors, Micro-Electro-Mechanical Systems (MEMS) sensors, and/or other photodetectors that are sensitive to light at an expected fluorescence wavelength of the qubits of the quantum computer. In various embodiments, the detectors may be in electronic communication with the controller 30 via one or more A/D converters 425 (see FIG. 4) and/or the like. For example, an atomic object being read and/or having its quantum state determined may emit an emitted signal, at least a portion of which is incident on a collection array of meta material structures formed and/or disposed on the surface of the atomic object confinement apparatus 300. The emitted signal being incident on the collection array of meta material structures induces the meta material structures to emit a detected signal directed toward and/or focused at collection optics of the atomic object confinement apparatus. The collection optics are configured to provide the collection signal to a photodetector.

In various embodiments, the quantum computer 110 comprises one or more voltage sources 50. For example, the voltage sources 50 may comprise a plurality of voltage drivers and/or voltage sources and/or at least one RF driver and/or voltage source. The voltage sources 50 may be electrically coupled to the corresponding potential generating elements (e.g., electrodes) of the confinement apparatus 300, in an example embodiment. In various embodiments, application of voltages provided by the voltage sources 50 to the electrodes of the confinement apparatus 300 generates a trapping and/or confining potential configured to confine ionized atomic objects by the atomic object confinement apparatus 300.

In various embodiments, a computing entity 10 is configured to allow a user to provide input to the quantum computer 110 (e.g., via a user interface of the computing entity 10) and receive, view, and/or the like output from the quantum computer 110. The computing entity 10 may be in communication with the controller 30 of the quantum computer 110 via one or more wired or wireless networks 20 and/or via direct wired and/or wireless communications. In an example embodiment, the computing entity 10 may translate, configure, format, and/or the like information/data, quantum computing algorithms and/or circuits, and/or the like into a computing language, executable instructions, command sets, and/or the like that the controller 30 can understand and/or implement.

In various embodiments, the controller 30 is configured to control the voltage sources 50, cryostat system and/or vacuum system controlling the temperature and pumping within the cryostat and/or vacuum chamber 40, manipulation sources 60, and/or other systems controlling various environmental conditions (e.g., temperature, pumping, and/or the like) within the cryostat and/or vacuum chamber 40 and/or configured to manipulate and/or cause a controlled evolution of quantum states of one or more atomic objects within the confinement apparatus. For example, the controller 30 may cause a controlled evolution of quantum states of one or more atomic objects within the confinement apparatus to execute a quantum circuit and/or algorithm. For example, the controller 30 may cause a reading procedure comprising coherent shelving to be performed, possibly as part of executing a quantum circuit and/or algorithm. In various embodiments, the atomic objects confined within the confinement apparatus are used as qubits of the quantum computer 110.

Example Loading Assembly

In various embodiments, the atomic object confinement apparatus comprises a plurality of electrodes that are configured to generate a confining potential. For example, the controller 30 may control the voltage sources 50 to provide electrical signals to the electrodes of the atomic object confinement apparatus such that the electrodes generate a confining potential. The confining potential is configured to confine a plurality of atomic objects within a confinement volume defined by the atomic object confinement apparatus. For example, in an example embodiment, the atomic object confinement apparatus is a surface ion trap and the confinement volume is a volume located proximate the surface of the surface ion trap. For example, the electrodes and/or confining potential are configured to define a plurality of atomic object positions within the confinement volume.

In various embodiments, the atomic object confinement apparatus is loaded by providing a substantially collimated atomic beam toward a loading position of the atomic object confinement apparatus and then ionizing the atomic objects within the substantially collimated atomic beam via an ionizing beam (e.g., a laser beam configured to ionize the atomic objects) when the atomic objects are close enough to the atomic object confinement apparatus to be trapped by the confining potential generated by the atomic object confinement apparatus. FIGS. 2 and 3 provide a side view and a cross-sectional view of an example loading assembly 200 configured for generating the substantially collimated atomic beam 5.

In various embodiments, the loading assembly 200 comprises a housing 215. In various embodiments, the housing 215 comprises a coupler 240 configured to couple the housing 215 to a flange, for example, of a cryostat and/or vacuum chamber 40 containing the atomic object confinement apparatus 300. In various embodiments, the housing 215 provides a structure (e.g., one or more optical coupler 210 to which optical elements (e.g., optical fibers) may be coupled to provide the optical beams (e.g., sympathetic cooling species cooling beams, sympathetic cooling species repump beams, and qubit species cooling beams) to form the MOT.

In various embodiments, the housing 215 further provides a structure to which a mirror array 214 is coupled. In various embodiments, the mirror array comprise a plurality of mirrors configured to, when a cooling beam is reflected therefrom, form the optical field of a 2D MOT. In various embodiments, the mirrors of the mirror array 214 are configured to reflect optical beams of different wavelengths. In various embodiments, the mirror array 214 comprises four or more mirrors (e.g., five mirrors) configured to cause a sympathetic cooling species beam and/or a qubit species cooling beam to cross the MOT axis 256 four times and from four different directions to form the 2D MOT. Moreover, the mirrors are configured to preserve the power and polarization of the sympathetic cooling species beam and/or a qubit species cooling beam as the beam reflects off of the mirror.

In various embodiments, the mirrors comprise a multilayer coating comprising multiple layers (e.g., more than two layers) of different kinds of glass such that the mirrors are able to reflect both the sympathetic cooling species beam and the qubit species cooling beam in along the prescribed path while maintaining and/or preserving the power and polarization of the beams. For example, the mirrors absorb very little to none of the power of the sympathetic cooling species beam and/or a qubit species cooling beam when the beam reflects off of the mirror due to the multilayer coating.

A specially engineered multilayer coating (one consisting of many layers of different kinds of glass) is used to give the mirrors the appropriate properties for reflecting both the Ba cooling and Yb cooling light. This coating must preserve polarization as well as having good reflectivity for both wavelengths (398.9 nm and 553.7 nm). The Ba repumps do not need to be reflected by these mirrors.

For example, the sympathetic cooling species cooling beams have a characteristic wavelength of 553.7 nm, and the qubit species cooling beams have a characteristic wavelength of 398.9 nm, in an example embodiment. Thus, in various embodiments, the wavelength difference between the sympathetic cooling species beam and the qubit species cooling beam is at least 50 nm. In various embodiments, the wavelength difference between the sympathetic cooling species beam and the qubit species cooling beam is greater than 100 nm. One or more mirrors of the mirror array 214 are configured to efficiently reflect each of these optical beams, despite the wide spread of characteristic wavelengths of the optical beams.

In various embodiments, the housing 215 provides a structure that is further configured to have one or more components of a vacuum system coupled thereto. For example, the housing 215 comprises an ion pump 262 and/or a non-evaporable getter 264 and/or couplings for attaching such to the housing 215. The ion pump and/or non-evaporable getter are part of a pump out apparatus and/or vacuum pump system configured to generate a vacuum within the loading assembly 200 (e.g., within MOT chamber 216 and/or dispensing chamber 236). For example, the pump out apparatus and/or vacuum pump system is configured to remove background gas and/or atomic gas that is not part of a substantially collimated atomic object beam from the interior of the loading assembly 200 (e.g., MOT chamber 216 and/or dispensing chamber 236). This reduces the amount of background gas present in the cryostat and/or vacuum chamber 40 that was contributed by the loading assembly 200. In an example embodiment, the housing 215 further comprises a valve 266 for use in connecting an external pump to the housing 215. For example, an external pump may be attached to the housing 215 during a bakeout procedure used to clean out the ovens 205 prior to operation of the loading assembly 200. In an example embodiment, the valve 266 is closed and an external pump is not secured thereto when the loading apparatus 200 is operated to provide a substantially collimated atomic object beam.

In various embodiments, the housing 215 provides a structure within which a mirror array 214 and magnet array 212 are secured and/or mounted such that, when the optical beams are provided via one or more optical couplers 210, the electro-magnetic field within the MOT chamber 216 forms a 2D MOT. For example, the housing 215 may provide a frame to which the mirror array 214 and magnet array 212 are mounted.

In various embodiments, the mirror array 214 and/or magnet array 212, and/or a frame to which they are mounted, is mounted to and/or supported by support structure 218. For example, the support structure 218 may be secured at a first end to coupler 240 and extend from the coupler 240 into the MOT chamber 216. The mirror array 214 and/or magnet array 212, and/or a frame to which they are mounted, are mounted to a second end of the support structure 218 disposed within the MOT chamber 216. In an example embodiment, the support structure 218 comprises a through path aligned with the beam path 235, the beam path axis 250, and/or the MOT axis 256 such that the substantially collimated atomic object beam generated by the 2D MOT may pass through the support structure 218 to the dispensing chamber 236.

In various embodiments the mirror array 214 is configured and/or arranged such that a MOT cooling beam (e.g., qubit atomic object species cooling beam or sympathetic atomic object species cooling beam) enters the chamber through the optical coupler 210, passes through the MOT chamber 216 (e.g., crosses the MOT axis 256 within MOT region 226) before encountering any mirrors of the mirror array 214. The MOT cooling beam then makes three 90 degree turns by reflecting off of three mirrors each at 45 degrees to the respective incident beam propagation direction. The MOT cooling beam then crosses itself at the MOT location (e.g., within MOT region 226 along the MOT axis 256 that includes the original MOT axis 256 crossing), is retro-reflected by a normal incidence mirror, and retraces its original beam path travelling in the opposite direction. The magnets of the magnet array 212 are positioned symmetrically around the MOT location and oriented to generate a magnetic field gradient with zero magnetic field within the MOT region 226.

In an example embodiment, the magnet array 212 is part of the frame configured to have the mirrors of the mirror array 214 mounted thereto. In various embodiments, the mirror array comprises a plurality of mirrors configured to generate an optical field of the 2D MOT within the MOT chamber 216. In various embodiments, the magnet array 212 is an array of one or more magnets configured to generate a magnetic field within the MOT chamber 216 so as to, with the optical field within the MOT chamber 216, generate a 2D MOT capable of generating a substantially collimated atomic object beam from the atomic fluxes provided to the MOT chamber 216 by the ovens 205.

In various embodiments, the 2D MOT defines a MOT axis 256. For example, the electro-magnetic field of the 2D MOT (e.g., within the MOT chamber 216) is configured to cool atomic objects (e.g., affect the kinetic energy of the atomic objects) within the MOT chamber 216 such that the velocity of the atomic objects aligns with the MOT axis 256. For example, the atomic objects traveling through the MOT chamber 216 may cluster about the MOT axis 256 and move in a direction along the MOT axis 256. In an example embodiment, the electro-magnetic field within the MOT chamber 216 is substantially the same in a first plane taken substantially perpendicular to the MOT axis 256 and a second plane taken at another point within the MOT chamber 216 and substantially perpendicular to the MOT axis 256. In various embodiments, the electro-magnetic potential of the 2D MOT (e.g., within the MOT chamber 216) has a stable minimum that extends along the MOT axis 256.

In various embodiments, the MOT axis 256 is aligned with a beam path axis 250 of the loading assembly 200. In various embodiments, the beam path axis 250 is defined by the beam path 235 defined by the differential pumping tube 230. For example, the MOT axis 256 is substantially parallel to and overlapping with the beam path axis 250.

In various embodiments, the loading assembly 200 comprises one or more ovens 205 (e.g., 205A, 205B). For example, the illustrated embodiment comprises two ovens—one for each species of atomic object to be loaded into the atomic object confinement apparatus 300. For example, in an example embodiment, the loading assembly 200 comprises a first oven and a second oven. The first oven is configured to generate a first atomic flux of a first atomic species and the second oven is configured to generate a second atomic flux of a second atomic species. The substantially collimated atomic beam 5 comprises atomic objects of both the first atomic species and the second atomic species. In the illustrated embodiment, the loading assembly 200 comprises a qubit species oven 205A and a sympathetic cooling species oven 205B. In various embodiments, the one or more ovens 205A, 205B each define an oven axis 255A, 255B. In various embodiments, each oven axis 255A, 255B is substantially transverse to and/or not parallel to the MOT axis 256 and/or beam path axis 250. In other words, each of the one or more ovens 205 is misaligned with the beam path 235. In the illustrated embodiment, a qubit species oven 205A defines a qubit species oven axis 255A that forms an angle $\varphi_A$ with the beam path axis 250 and a sympathetic cooling species oven 205B defines a sympathetic cooling species oven axis 255B that forms an angle $\varphi_B$ with the beam path axis 250. In various embodiments, the angles $\varphi_A$ and $\varphi_B$ are the substantially equal. In an example embodiment, the angles $\varphi_A$ and $\varphi_B$ are different. In various embodiments, the angles $\varphi_A$ and $\varphi_B$ are each in a range of 5 to 45 degrees. In an example embodiment, the angles $\varphi_A$ and $\varphi_B$ are the substantially equal to and/or approximately 10 degrees.

In various embodiments, each oven 205A, 205B comprises heating control lines 206. The heating control lines pass through a respective one of feedthroughs 202A, 202B and are in electrical communication with a heating element of a corresponding heating chamber. For example, in various embodiments, the heating control lines 206 are configured for providing an electric current to a heating element within the heating chamber 204 (e.g., 204A, 204B) of the corresponding oven 205. In various embodiments, the controller 30 controls the electric current provided via the heating control lines 206. The heating element is configured to heat an atomic object comprising matter (e.g., a film, filament, solid, and/or the like) disposed within the heating chamber 204. For example, the qubit species oven 205A is configured to have an atomic object comprising matter comprising atomic objects of the qubit species disposed therein and the sympathetic cooling species oven 205B is configured to have an atomic object comprising matter comprising atomic objects of the sympathetic cooling species disposed therein. Heating the atomic object comprising matter causes atomic objects of the corresponding species to be converted from a solid state of matter to a gaseous state of matter within the heating chamber 202. The atomic objects in the gaseous state exit the corresponding oven 205 via the oven nozzle 208 (e.g., 208A, 208B). In various embodiments, the oven nozzles 208A, 208B are configured to direct the atomic objects in the gaseous state into the MOT chamber 216. For example, the atomic objects exit the ovens 205A, 205B via the respective oven nozzle 208A, 208B and enter the MOT chamber 216 where they experience the electro-magnetic field of the 2D MOT. For example, the ovens 205 are each configured to generate a respective atomic flux of a respective atomic species via the respective oven nozzle 208. In various embodiments, each oven nozzle 208A, 208B is a microcapillary array. For example, an oven nozzle 208 comprises a plurality of microcapillaries or microtubes.

As noted above, the 2D MOT is configured to affect the kinetic energy of the atomic objects such that the velocity of the atomic objects becomes aligned with the MOT axis 256. In particular, a cloud of atomic objects (e.g., comprising atomic objects of both the qubit and sympathetic cooling species) enters the MOT chamber 216. The electro-magnetic field of the 2D MOT (generated by the magnet array 212 and the optical field formed by reflecting the optical beams from the mirror array 214) transforms the cloud of atomic objects into a substantially collimated atomic object beam. For example, the 2D MOT is configured to generate a substantially collimated atomic beam from the respective atomic fluxes generated by the one or more ovens 205. In various embodiments, the substantially collimated atomic object beam 5 has a beam diameter that is less than ten millimeters (e.g., approximately 5 millimeters or less).

In various embodiments, the substantially collimated atomic object beam is dispensed from the loading assembly 200 via differential pumping tube 230. In various embodiments, the substantially collimated atomic object beam exiting the through the path of the support structure 218 continues to flow along the beam path axis 250 along the beam path 235 defined by the differential pumping tube 230. In an example embodiment, the differential pumping tube 230 may further be used to further collimate the substantially collimated atomic object beam, adjust the velocity of the atomic objects of the substantially collimated atomic object beam (e.g., adjust the velocity component in the direction along the beam path axis 250), and/or the like. For example, atomic objects having velocities that are not aligned with the beam path axis 250 will tend to collide with the wall of the differential pumping tube 230 and not be dispensed as part of the substantially collimated atomic object beam 5. For example, the differential pumping tube 230 reduces and/or prevents background gas generated by the heating and/or operation of the ovens 205 from entering the cryostat and/or vacuum chamber 40.

The substantially collimated atomic object beam 5 exits the loading assembly 200 via the differential pumping tube 230 and continues to travel in a direction aligned with the beam path axis 250. In various embodiments, the differential pumping tube 230 is positioned and/or configured such that the substantially collimated atomic object beam 5 exiting the differential pumping tube 230 is directed toward the loading position 305 of the atomic object confinement apparatus 300. For example, the beam path axis 250 may be aligned with the loading position 305 of the atomic object confinement apparatus 300.

The housing 215 of the loading assembly 200 also includes a number of diagnostic viewports 225 (e.g., 225A-E) and a gate valve 220 to allow separate testing of the MOT assembly 201 as a module and maintenance of either the cryostat and/or vacuum chamber 40 and/or contents thereof or the MOT assembly 201 without breaking vacuum on the other part of the complete assembly. In various embodiments, the MOT assembly comprises the optical couplers 210, mirror array 214, magnet array 214, a frame to which the mirror array and/or magnet array is mounted, MOT chamber 216, filtering tube 218, dispensing chamber 236, the differential pumping tube 230, and/or ovens 205.

In various embodiments, the loading assembly 200 is configured to selectively provide a substantially collimated atomic object beam 5. In various embodiments the 2D MOT enables the loading assembly 200 to selectively provide the substantially collimated atomic object beam 5. For example, in various embodiments, when the optical beams are present to form the 2D MOT (e.g., one or more manipulation sources 60 are generating and providing optical beams), the loading assembly 200 provides the substantially collimated atomic object beam 5. However, when the optical beams are not present to form the 2D MOT (e.g., the one or more manipulation sources 60 are not generating and providing and/or a modulator prevents the optical beams from being coupled into the loading assembly 200 via the optical coupler 210), the atomic objects within the MOT chamber 216 are not captured and/or cooled so as to form the substantially collimated atomic object beam 5. Rather, the atomic objects within the MOT chamber 216 will be pumped out via the ion pump and/or other vacuum pump (e.g., coupled to the MOT chamber 216 via connector 262, for example). In various embodiments, the effective switching time is in a range of two to ten milliseconds (e.g., approximately 5 milliseconds). As used herein, the effective switching time is the length of time between when a command to stop or start providing the substantially collimated atomic object beam 5 is executed by a processing device (e.g., of the controller 30) and/or provided to a driver of the manipulation source 60 and when the substantially collimated atomic object beam 5 stops or starts being dispensed by the loading assembly 200 and/or being incident on the loading position 305 of the atomic object confinement apparatus 300. This allows for a faster response to various events, such as needing to re-populate the atomic object population within the atomic object confinement apparatus due to atomic object loss caused by collisions with background gas, for example.

Technical Advantages

Various embodiments provide technical solutions to the accurate and efficient delivery of atomic objects to an atomic object confinement apparatus. Conventional techniques for providing atomic objects to an atomic object confinement apparatus include having small mass ovens located within a few centimeters of the atomic object confinement apparatus. These small mass ovens radiate a significant amount of heat near the atomic object confinement apparatus, provide a significant amount of background gas in the vicinity of the atomic object confinement apparatus, and provide a low flux of atomic objects which leads to long loading times for loading a sufficient number of atomic objects into the atomic object confinement apparatus. Various embodiments provide technical improvements to such conventional techniques. In particular, various embodiments enable the loading apparatus to be located more than 0.25 meters (e.g., approximately 0.4 meters) from the atomic object confinement apparatus, which reduces the amount of heat in the vicinity of the atomic object confinement apparatus that was radiated from the loading apparatus compared to conventional loading techniques. Moreover, the extended distance between the loading apparatus and the atomic object confinement apparatus enables the positioning of thermal shields between the loading apparatus and the atomic object confinement apparatus to further reduce excess heat in the vicinity of the atomic object confinement apparatus. Additionally, as the ovens of various embodiments of the loading assembly do not have a direct line of sight of atomic object confinement apparatus, less background gas is emitted from the loading apparatus into the vicinity of the atomic object confinement apparatus compared to conventional loading techniques. Moreover, the substantially collimated atomic object beam enables the atomic object confinement apparatus to be loaded quickly and efficiently (e.g., a higher percentage of the atomic objects in the substantially collimated atomic object beam become confined by the atomic object confinement apparatus compared to atomic objects provided to the atomic object confinement apparatus using conventional techniques. Thus, various embodiments provide technical improvements to various fields relating to confining atomic objects within an atomic object confinement apparatus.

Additionally, the loading assembly is capable of responding to events, such as repopulating the atomic object confinement apparatus by providing the substantially collimated atomic object beam when the population of atomic objects within the atomic object confinement apparatus becomes low or stopping providing the substantially collimated atomic object beam when the population of the atomic objects within the atomic object confinement apparatus is sufficient. In various embodiments, the loading assembly is capable of responding to such events with a switching time of approximately five milliseconds by maintaining the ovens at or close to a dispensing temperature and turning the 2D MOT on or off via the presence or lack of presence of the optical beam(s). Conventional techniques for providing atomic objects to an atomic object confinement apparatus require significantly longer switching times (e.g., one to two minutes to begin providing atomic objects and 30 seconds to five minutes to stop providing atomic objects and/or background gas) as the oven must be kept at a low temperature due to its proximity to the atomic object confinement apparatus. Thus, the conventional oven requires a significantly longer switching time that is governed by oven heating and/or cooling times. As such various embodiments provide technical improvements by reducing both the time required to populate and/or repopulate the atomic objects within the atomic object confinement apparatus while also reducing the amount of background gas introduced into the cryostat and/or vacuum chamber by the loading assembly.

As quantum computers with more and more qubits are desired and built, a technical problem exists of how to efficiently load such numbers of atomic objects (e.g., at least two atomic objects per qubit of the quantum computer in systems that use a sympathetic cooling ion to aid in cooling the qubit ions). Various embodiments of the present invention provide technical solutions to this technical problem while also decreasing computational errors of the quantum computer by reducing background gas in the vicinity of the atomic object confinement apparatus and minimizing heat radiated into the vicinity of the atomic object confinement apparatus. Thus, various embodiments provide improvements to the field of trapped ion quantum computing.

Exemplary Controller

In various embodiments, an atomic object confinement apparatus 300 is incorporated into a system (e.g., a quantum computer 110) comprising a controller 30. In various embodiments, the controller 30 is configured to control various elements of the system (e.g., quantum computer 110). For example, the controller 30 may be configured to control the voltage sources 50, a cryostat system and/or vacuum system controlling the temperature and pumping within the cryostat and/or vacuum chamber 40, manipulation sources 60, cooling system, and/or other systems controlling the environmental conditions (e.g., temperature, humidity, pumping, and/or the like) within the cryostat and/or vacuum chamber 40 and/or configured to manipulate and/or cause a controlled evolution of quantum states of one or more atomic objects confined by the atomic object confinement apparatus 300. In various embodiments, the controller 30 may be configured to receive signals from one or more optics collection systems.

Figure 4:
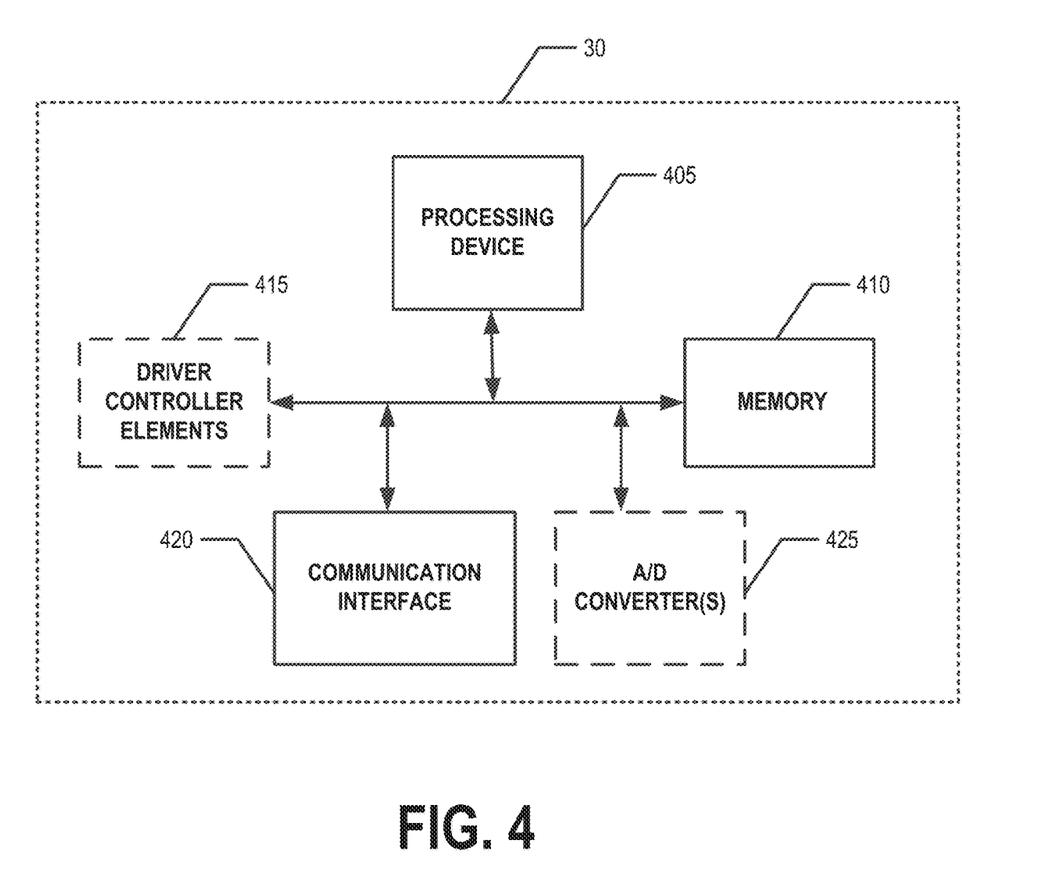
FIG. 4 provides a schematic diagram of an example controller of a quantum computer configured to perform one or more deterministic reshaping and/or reordering functions, according to various embodiments.

As shown in FIG. 4, in various embodiments, the controller 30 may comprise various controller elements including processing elements 405, memory 410, driver controller elements 415, a communication interface 420, analog-digital converter elements 425, and/or the like. For example, the processing elements 405 may comprise programmable logic devices (CPLDs), microprocessors, coprocessing entities, application-specific instruction-set processors (ASIPs), integrated circuits, application specific integrated circuits (ASICs), field programmable gate arrays (FPGAs), programmable logic arrays (PLAs), hardware accelerators, other processing devices and/or circuitry, and/or the like. and/or controllers. The term circuitry may refer to an entirely hardware embodiment or a combination of hardware and computer program products. In an example embodiment, the processing element 405 of the controller 30 comprises a clock and/or is in communication with a clock.

For example, the memory 410 may comprise non-transitory memory such as volatile and/or non-volatile memory storage such as one or more of as hard disks, ROM, PROM, EPROM, EEPROM, flash memory, MMCs, SD memory cards, Memory Sticks, CBRAM, PRAM, FeRAM, RRAM, SONOS, racetrack memory, RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. In various embodiments, the memory 410 may store a queue of commands to be executed to cause a quantum algorithm and/or circuit to be executed (e.g., an executable queue), qubit records corresponding the qubits of quantum computer (e.g., in a qubit record data store, qubit record database, qubit record table, and/or the like), a calibration table, computer program code (e.g., in a one or more computer languages, specialized controller language(s), and/or or the like), and/or the like. In an example embodiment, execution of at least a portion of the computer program code stored in the memory 410 (e.g., by a processing element 405) causes the controller 30 to perform one or more steps, operations, processes, procedures and/or the like described herein for providing manipulation signals to form the 2D MOT and/or ionize atomic objects in the confining potential of the atomic object confinement apparatus, operate the ovens, and/or the like such that atomic objects are loaded into the atomic object confinement apparatus 300.

In various embodiments, the driver controller elements 410 may include one or more drivers and/or controller elements each configured to control one or more drivers. In various embodiments, the driver controller elements 410 may comprise drivers and/or driver controllers. For example, the driver controllers may be configured to cause one or more corresponding drivers to be operated in accordance with executable instructions, commands, and/or the like scheduled and executed by the controller 30 (e.g., by the processing element 405). In various embodiments, the driver controller elements 415 may enable the controller 30 to operate a voltage sources 50 (e.g., for controlling the confining potential of the atomic object confinement apparatus, operating the ovens, and/or the like), manipulation sources 60, cooling system, and/or the like. In various embodiments, the drivers may be laser drivers configured to operate one or manipulation sources 60 to generate manipulation signals; vacuum component drivers; drivers for controlling the flow of current and/or voltage applied to electrodes used for maintaining and/or controlling the trapping and/or confining potential of the atomic object confinement apparatus 300 (and/or other drivers for providing driver action sequences to potential generating elements of the atomic object confinement apparatus); cryostat and/or vacuum system component drivers; cooling system drivers, and/or the like. In various embodiments, the controller 30 comprises means for communicating and/or receiving signals from one or more optical receiver components (e.g., photodetectors of the optics collection system). For example, the controller 30 may comprise one or more analog-digital converter elements 425 configured to receive signals from one or more optical receiver components (e.g., a photodetector of the optics collection system), calibration sensors, and/or the like.

In various embodiments, the controller 30 may comprise a communication interface 420 for interfacing and/or communicating with a computing entity 10. For example, the controller 30 may comprise a communication interface 420 for receiving executable instructions, command sets, and/or the like from the computing entity 10 and providing output received from the quantum computer 110 (e.g., from an optical collection system) and/or the result of a processing the output to the computing entity 10. In various embodiments, the computing entity 10 and the controller 30 may communicate via a direct wired and/or wireless connection and/or via one or more wired and/or wireless networks 20.

Exemplary Computing Entity

Figure 5:
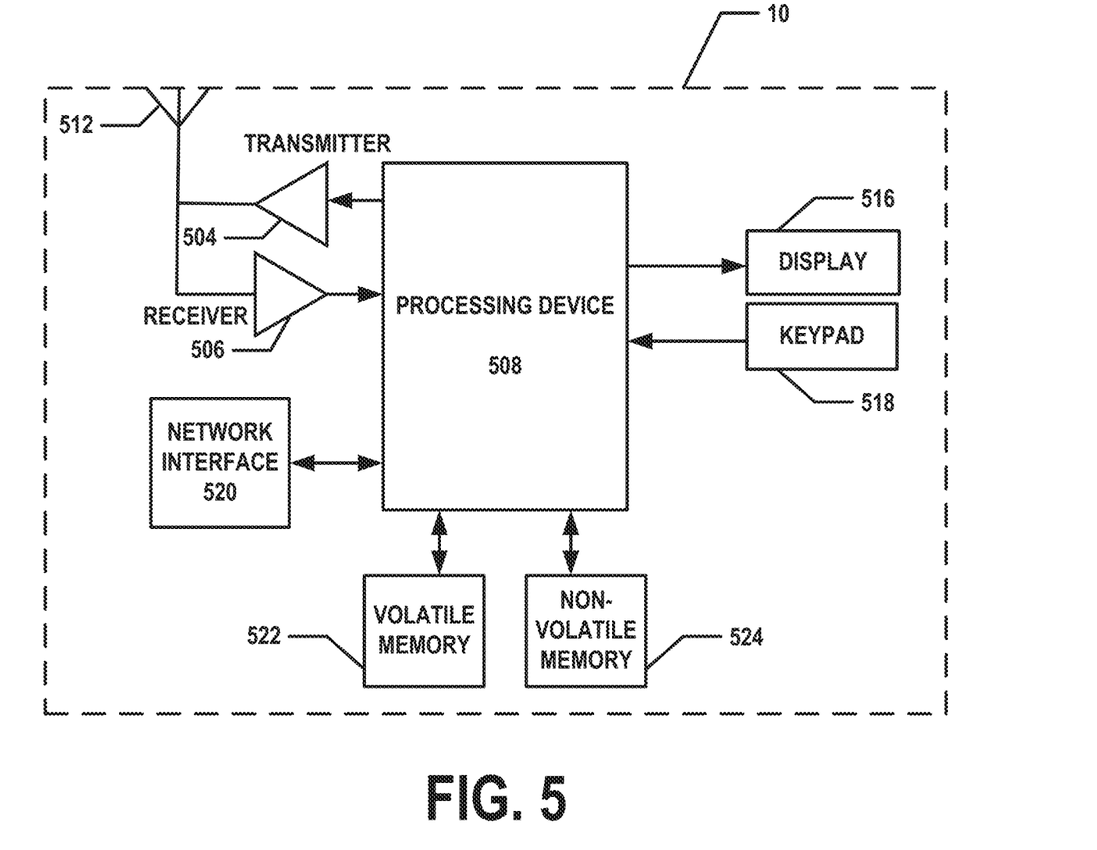
FIG. 5 provides a schematic diagram of an example computing entity of a quantum computer system that may be used in accordance with an example embodiment.

FIG. 5 provides an illustrative schematic representative of an example computing entity 10 that can be used in conjunction with embodiments of the present invention. In various embodiments, a computing entity 10 is configured to allow a user to provide input to the quantum computer 110 (e.g., via a user interface of the computing entity 10) and receive, display, analyze, and/or the like output from the quantum computer 110.

As shown in FIG. 5, a computing entity 10 can include an antenna 512, a transmitter 504 (e.g., radio), a receiver 506 (e.g., radio), and a processing element 508 that provides signals to and receives signals from the transmitter 504 and receiver 506, respectively. The signals provided to and received from the transmitter 504 and the receiver 506, respectively, may include signaling information/data in accordance with an air interface standard of applicable wireless systems to communicate with various entities, such as a controller 30, other computing entities 10, and/or the like. In this regard, the computing entity 10 may be capable of operating with one or more air interface standards, communication protocols, modulation types, and access types. For example, the computing entity 10 may be configured to receive and/or provide communications using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 10 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol. The computing entity 10 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

Via these communication standards and protocols, the computing entity 10 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The computing entity 10 can also download changes, add-ons, and updates, for instance, to its firmware, software (e.g., including executable instructions, applications, program modules), and operating system.

The computing entity 10 may also comprise a user interface device comprising one or more user input/output interfaces (e.g., a display 516 and/or speaker/speaker driver coupled to a processing element 508 and a touch screen, keyboard, mouse, and/or microphone coupled to a processing element 508). For instance, the user output interface may be configured to provide an application, browser, user interface, interface, dashboard, screen, webpage, page, and/or similar words used herein interchangeably executing on and/or accessible via the computing entity 10 to cause display or audible presentation of information/data and for interaction therewith via one or more user input interfaces. The user input interface can comprise any of a number of devices allowing the computing entity 10 to receive data, such as a keypad 518 (hard or soft), a touch display, voice/speech or motion interfaces, scanners, readers, or other input device. In embodiments including a keypad 518, the keypad 518 can include (or cause display of) the conventional numeric (0-9) and related keys (#, *), and other keys used for operating the computing entity 10 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the computing entity 10 can collect information/data, user interaction/input, and/or the like.

The computing entity 10 can also include volatile storage or memory 522 and/or non-volatile storage or memory 524, which can be embedded and/or may be removable. For instance, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SWIM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the computing entity 10.

CONCLUSION

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A loading assembly for providing atomic objects to an atomic object confinement apparatus, the loading assembly comprising:
  one or more ovens, each oven of the one or more ovens (a) comprising a respective oven nozzle and (b) configured to generate a respective atomic flux of a respective atomic species via the respective oven nozzle;
  a mirror array and a magnet array configured to, when optical beams are provided to the mirror array, generate a two-dimensional magneto-optical trap (2D MOT), wherein the 2D MOT is configured to generate a substantially collimated atomic beam from the respective atomic fluxes generated by the one or more ovens; and a differential pumping tube defining a beam path, wherein the differential pumping tube is configured to provide the substantially collimated atomic beam via the beam path, wherein the respective oven nozzle of each of the one or more ovens is misaligned with the beam path and the 2D MOT is configured to provide the substantially collimated atomic beam in alignment with the beam path.

2. The loading assembly of claim 1, wherein the one or more ovens comprises a first oven and a second oven, the first oven configured to generate a first atomic flux of a first atomic species, the second oven configured to generate a second atomic flux of a second atomic species, and the substantially collimated atomic beam comprises atomic objects of one or both of the first atomic species and the second atomic species.

3. The loading assembly of claim 2, wherein the 2D MOT comprises a first laser beam of a first wavelength and a second laser beam of a second wavelength and at least one mirror of the mirror array is configured to reflect both the first wavelength and the second wavelength.

4. The loading assembly of claim 3, wherein a difference between the first wavelength and the second wavelength is at least 50 nm.

5. The loading assembly of claim 1, wherein the differential pumping tube is configured to maintain a pressure differential between an interior of the loading assembly and an environment exterior to the loading assembly proximate the differential pumping tube.

6. A system comprising:
an atomic object confinement apparatus; and
a loading assembly configured for providing atomic objects to the atomic object confinement apparatus, the loading assembly comprising:
  one or more ovens, each oven of the one or more ovens (a) comprising a respective oven nozzle and (b) configured to generate a respective atomic flux of a respective atomic species via the respective oven nozzle;
  a mirror array and a magnet array configured to, when optical beams are provided to the mirror array, generate a two-dimensional magneto-optical trap (2D MOT), wherein the 2D MOT is configured to generate a substantially collimated atomic beam from the respective atomic fluxes generated by the one or more ovens; and
  a differential pumping tube defining a beam path, wherein the differential pumping tube is configured to provide the substantially collimated atomic beam via the beam path,
  wherein the respective oven nozzle of each of the one or more ovens is misaligned with the beam path and the 2D MOT is configured to provide the substantially collimated atomic beam in alignment with the beam path.

7. The system of claim 6, wherein the respective oven nozzle of each of the one or more ovens does not have a direct line of sight of the atomic object confinement apparatus.

8. The system of claim 6, wherein a distance between the loading assembly and the atomic object confinement apparatus is greater than 0.25 meters.

9. The system of claim 6, wherein the atomic object confinement apparatus and the loading assembly are disposed, at least in part, within a cryostat and/or vacuum chamber.

10. The system of claim 6, further comprising one or more thermal shields disposed between the atomic object confinement apparatus and the loading assembly.

11. The system of claim 10, wherein the one or more thermal shields each comprise an opening aligned with the differential pumping tube.

12. The system of claim 6, wherein the one or more ovens comprises a first oven and a second oven, the first oven configured to generate a first atomic flux of a first atomic species, the second oven configured to generate a second atomic flux of a second atomic species, and the substantially collimated atomic beam comprises atomic objects of one or both of the first atomic species and the second atomic species.

13. The system of claim 12, wherein the 2D MOT comprises a first laser beam of a first wavelength and a second laser beam of a second wavelength and at least one mirror of the mirror array is configured to reflect both the first wavelength and the second wavelength.

14. The system of claim 13, wherein the first wavelength is configured to cool atomic objects of the first atomic species and the second wavelength is configured to cool atomic objects of the second atomic species.

15. The system of claim 13, wherein a difference between the first wavelength and the second wavelength is greater than 50 nm.

16. The system of claim 13, wherein the system is a quantum computer, the atomic objects of the first atomic species confined within the atomic object confinement apparatus are used as qubits of the quantum computer and the atomic objects of the second atomic species confined within the atomic object confinement apparatus are used to sympathetically cool the qubits of the quantum computer.

17. The system of claim 6, wherein the differential pumping tube is configured to maintain a pressure differential between an interior of the loading assembly and an interior of a chamber enclosing the atomic object confinement apparatus.

18. The system of claim 6, further comprising one or more lasers configured to generate and provide the optical beams.

19. The system of claim 18, further comprising a controller, wherein the controller is configured to control operation of the one or more lasers.

20. The system of claim 6, further comprising a controller, wherein the controller is configured to control the one or more ovens and a trapping potential generated by electrodes of the atomic object confinement apparatus.

* * * * *